United States Patent [19]

Bertocchi

[11] Patent Number: 5,993,876
[45] Date of Patent: Nov. 30, 1999

[54] PROCESS FOR ENZYMATIC INACTIVATION SUBSEQUENT TO THE EXTRACTION OF PUREE FROM FOOD PRODUCTS

[76] Inventor: Alessandro Bertocchi, 8 Via Argonne, Parma, Italy, 43100

[21] Appl. No.: 08/991,532

[22] Filed: Dec. 16, 1997

[30] Foreign Application Priority Data

Dec. 23, 1996 [IT] Italy .................................. PR96A0056

[51] Int. Cl.⁶ ............................ A23B 7/005; A23B 7/153
[52] U.S. Cl. ......................... 426/388; 426/486; 426/519; 426/521
[58] Field of Search ..................................... 426/520, 521, 426/518, 519, 388, 615, 486, 489

[56] References Cited

U.S. PATENT DOCUMENTS

| | | | |
|---|---|---|---|
| 4,543,879 | 10/1985 | Catelli | 99/472 |
| 4,670,281 | 6/1987 | Bradley | 426/481 |
| 5,171,598 | 12/1992 | Catelli | 426/388 |
| 5,756,141 | 5/1998 | Chen et al. | 426/599 |

FOREIGN PATENT DOCUMENTS 1 339 939   12/1973   United Kingdom.

*Primary Examiner*—Keith Hendricks
*Attorney, Agent, or Firm*—Darby & Darby

[57] ABSTRACT

The invention falls within the sector of processes and plants for the processing of food products, in particular fruit. The process envisages enzymatic inactivation of purée by means of heating in a recirculation circuit kept full of purée. The plant comprises a pump which introduces the purée emerging at room temperature from a strainer into the recirculation circuit through a device for mixing the purée. No intermediate storage tanks or heat exposure tanks are provided.

6 Claims, 4 Drawing Sheets

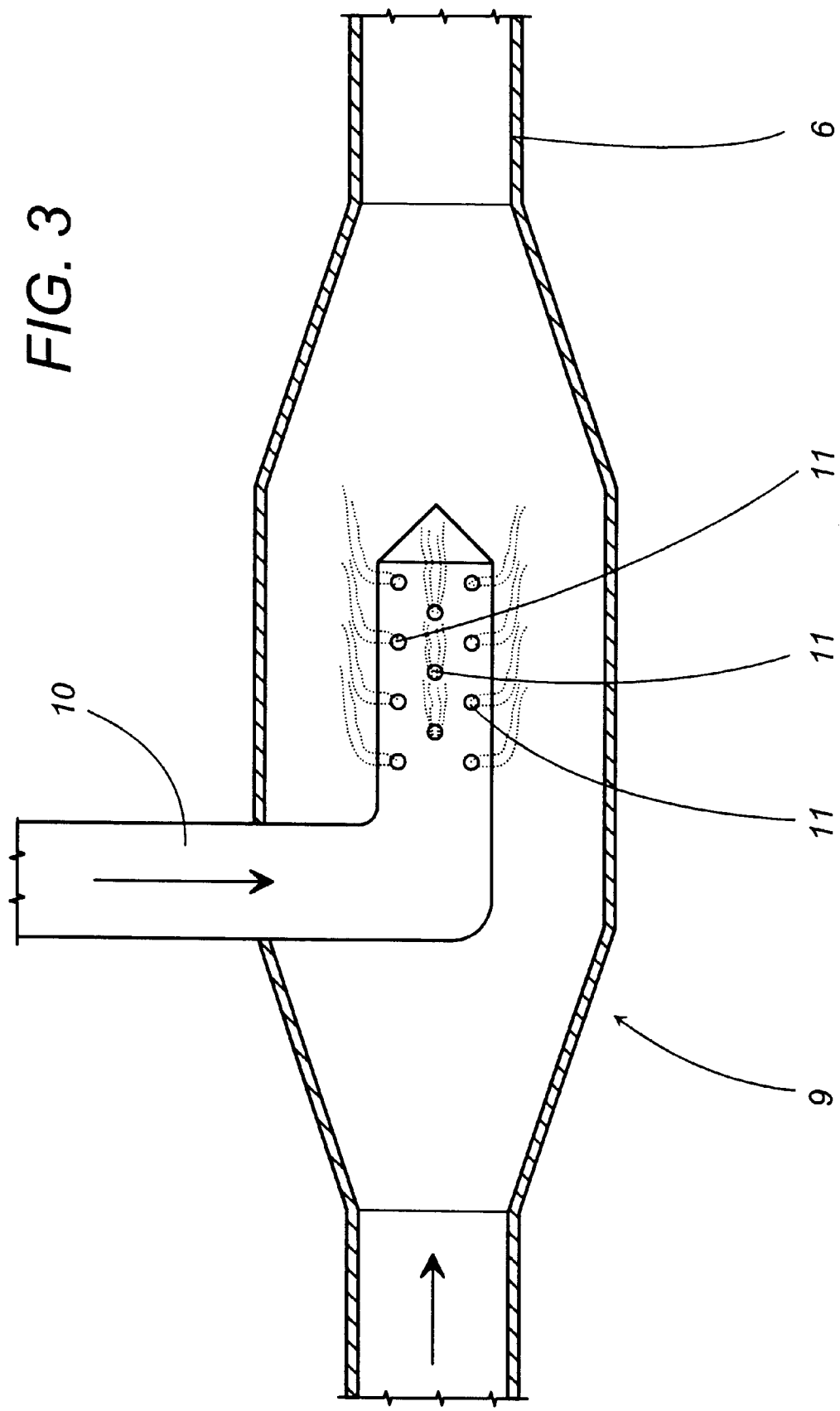

PROCESS FOR ENZYMATIC INACTIVATION SUBSEQUENT TO THE EXTRACTION OF PUREE FROM FOOD PRODUCTS

BACKGROUND OF THE INVENTION

The present invention concerns a process and a plant for enzymatic inactivation relating to the extraction of purée from food products. The term purée means the pulp of the product in a substantially creamy condition, and then not into pieces, obtained through a strainer which remove the waste matter from the product.

At present, in order to extract purée from food products, generally the product is cold-crushed and then heated with the aim of achieving enzymatic inactivation of the crushed matter which then passes into a strainer or refiner for separating the purée from the waste matter (skins, seeds, stalks, etc.).

When, owing to the particular chemical composition of the processed fruit, there are no significant phenomena involving oxidation, change in colour or separation of liquid parts from solid parts, or when the purée itself is intended for uses where the consistency, colour and separation of solid from liquid are of no importance, in such cases it is possible to perform cold extraction (at room temperature) without any particular precautions during the ensuing heating stage.

In the case, however, of the cold extraction of purée from apples or similar products (such as pears, apricots and peaches, for example) or from products where the loss of consistency, oxidation and separation of solid parts from liquid parts are undesirable phenomena which are to be avoided at all costs, it is necessary to perform enzymatic inactivation immediately in order to avoid such phenomena produced by the pectolytic enzymes.

Cold extraction of the purée ensures optimum quality of the product obtained, and the plant which performs the enzymatic inactivation heat-treatment after extraction must reduce to a minimum the harmful effects (browning, change in taste, etc.) of the high-temperature exposure period on the fresh purée.

At present the plants used for enzymatic inactivation of crushed fruit (and not purée) are also used for the enzymatic inactivation of the cold-extracted purée, but said plants are not suitable for avoiding the abovementioned harmful effects since they are expressly designed so as to ensure long heat: exposure of the product within the plant so that the heat is able to reach the centre of the crushed parts.

In particular said heating is performed by means of a screw with direct steam injection, or with a rotating coil, or by means of a plant of the "pipe-in-pipe" type (in which the product to be heated passes inside one pipe and the heating fluid passes inside the other one, with considerable slowness of the heating process), or else with recirculation of the product within pipe bundles involving the use of a rest tank for heat exposure, in accordance with the configurations schematically illustrated in FIG. 1, which also shows a pipe connecting pipe bundle G and tank F and another pipe on which there are located the inlet and the outlet for the product, a circulation pump H and the instruments necessary for monitoring the process.

With said tank, which is kept at atmospheric pressure or under a slight vacuum to promote evaporation of a small part of liquid present in the crushed fruit, it is possible to obtain enzymatic inactivation and high yields during the following purée extraction stage.

The product enters the recirculation plant (in which there is a pipe bundle where heating takes place) and is mixed by a centrifugal pump, the mechanical action of which, however, may cause an undesirable reduction in the consistency of the purée.

It also necessary to have an extraction pump in order to transfer the heated purée to the next stage.

From IT 1165757 a process and a plant are known for an enzymatic deactivation of chopped product in which the chopped product is introduced into a pressurized and heated (up to over than 100° C.) recirculation circuit.

The drawback is the high temperature and the exposure of the product to high temperatures in the pressurized tank.

In addition to the drawback of the long periods of heat exposure of the product, a further drawback is due to the fact that the traditional plants have stations which are separate and often distant from one another for performing extraction of the purée and carrying out enzymatic inactivation.

Moreover, in traditional plants, after the strainer there is arranged a purée storage tank for supplying a pump which transfers the purée to the plant. This provides the production line with the necessary flexibility since the purée extraction stage and enzymatic inactivation stage are rendered independent to a certain extent by the presence of the tank with the functions of a storage lung. This storage inside the tank is, however, extremely damaging since the purée is at room temperature, the enzymes are active and there is the risk of rapid degradation of the product with gradual oxidation (due to the air which is incorporated during extraction), change in colour and loss of consistency. Moreover, in order to limit these phenomena, use must be made of a significant quantity of inert gas with obvious additional costs, or anti-oxidizing solutions which are also costly and are not liked by the manufacturers of high-quality purée without chemical additives, which is typically used for baby food.

SUMMARY OF THE INVENTION

The object of the present invention is to eliminate the aforementioned drawbacks and provide a process and a plant which allow cold-extraction of the purée using a simplified enzymatic inactivation process which reduces to a minimum the heat exposure of the product, leaving the latter as natural as possible, and which uses a small quantity of inert gas or anti-oxidizing solution.

A further object is to avoid the use of the rest tank for heat exposure, the storage tank and the extraction pump.

Said objects are fully achieved by the process and the plant which form the subject of the present invention and which are characterized by the contents of the claims indicated below and in particular by the fact that the process involves a circulation of the purée in a recirculation circuit kept full in such a way as the product is never in direct contact with environments containing air, steam or gas.

The quantity of purée emerging from the recirculation circuit at the enzymatic inactivation temperature is therefore exactly equal to the quantity of purée entering at room temperature into the recirculation circuit, no intermediate storage tank being present, nor tank in which the product is exposed to high temperature.

The purée which emerges at room temperature from the strainer is conveyed by a pump into the plant recirculation circuit entirely filling it.

The plant preferably comprises two heat exchangers between which a lobe pump operates and the pipe sections for connecting the heat exchangers are overall less than about 3 m and are preferably between 2 m and 3 m.

BRIEF DESCRIPTION OF THE DRAWINGS

These arid other characteristic features will emerge more clearly from the following description of two preferred embodiments illustrated, purely by way of a non-limiting example, in the accompanying plates of drawings, in which:

FIG. 3 is a detail of the plant according to FIG. 2, showing a device for mixing hot product with cold product;

DESCRIPTION OF THE PREFERRED EMBODIMENTS

Figure 1:
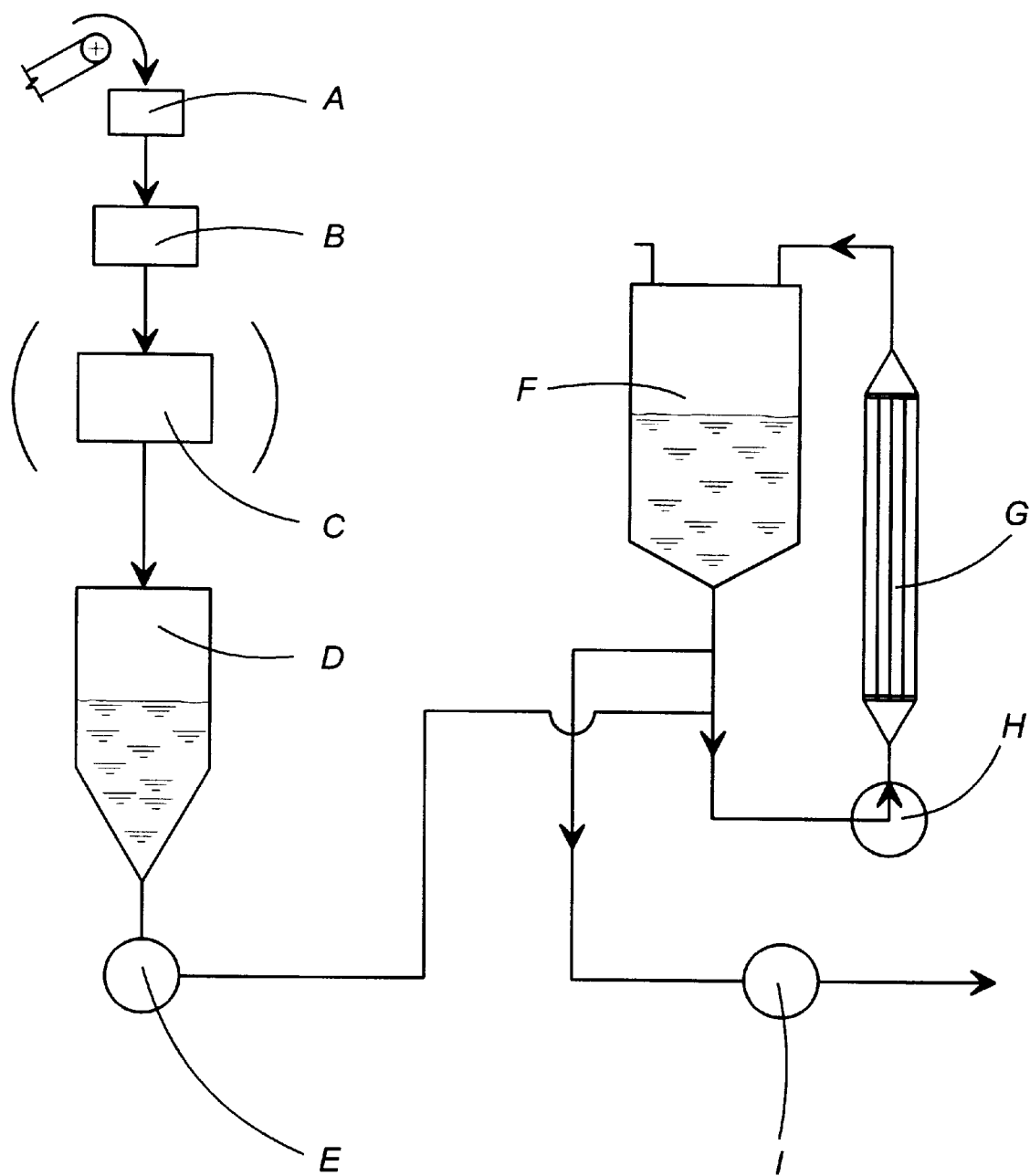
FIG. 1 shows schematically a plant according to the prior art comprising the following components:
A) crusher
B) strainer
C) a refiner (if applicable)
D) tank for storing the purée at room temperature
E) supply pump
F) heat exposure tank
G) pipe bundle
H) centrifugal circulation pump
I) extraction pump
Figure 2:
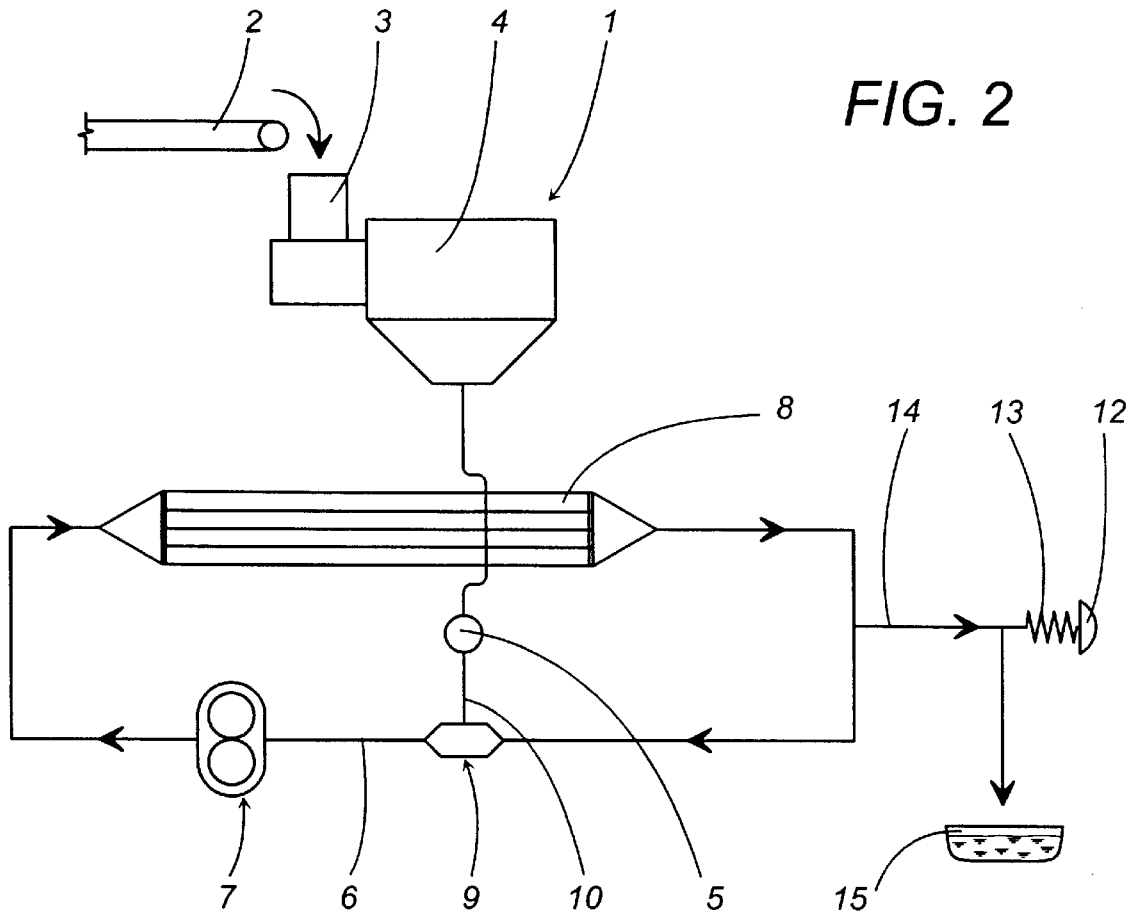
FIG. 2 shows the plant according to the present invention.

With reference to FIGS. 2 and 3, 1 denotes in its entirety a plant for the extraction of purée from food products, and more particularly from apples, peaches, pears, apricots and similar fruit, in which the purée is subject to the activity of pectolytic enzymes or in any case to oxidation and browning phenomena.

A conveyor 2 conveys the food product into a hopper 3 for introduction into a cold-type softening/straining assembly 4, for example of the type described in the Industrial Patent Nos. 1,249,363 and 1,199,392, which allow the conversion of the whole fruit into purée in a few seconds.

The strainer directly discharges the purée into a volumetric pump 5 supplying a recirculation circuit 6 which contains a circulation pump 7 of the lobe type which exerts a very delicate pumping action on the processed product and is intended to convey the purée into a heat exchanger 8 of a substantially conventional type, in which the purée in recirculation circuit 6 is subject to a rapid heating action (of the order of a few tenths of seconds) up to a temperature of about 80–100° C., sufficient to obtain enzymatic inactivation.

The heat exposure is very brief and the pipes used in the plant have a small diameter (of between 100 mm and 200 mm) arid this makes it possible to avoid changes in the organoleptic properties of the purée due to standing at a high temperature for a long period of time.

Mixing of the hot purée, circulating inside the circuit 6, with the purée at room temperature supplied by the supply pump 5, is performed by means of a device 9 which is illustrated in greater detail in FIG. 3 and which allows the temperature of the fresh purée to be brought up rapidly to that of the hot recirculation purée, necessary for correct operation of the plant.

The device 9 is designed such that the duct 10 supplying the purée at room temperature emerges into the recirculation circuit 6 with a tube portion which is closed at the end, but provided with a plurality of holes 11 on its side surface and arranged with the last section in the same direction as that of the recirculation circuit at that point.

The purée inside the entire recirculation circuit 6 may be kept at a pressure of about 1.5 to 4 bar, namely at a pressure greater than atmospheric pressure, but the purée may also be kept at atmospheric pressure or less. The plant 1 according to FIG. 2 comprises a counter-pressure device consisting of a counter-pressure valve 12 which balances the pressure provided by the pump 5 supplying the purée.

This valve, provided with an adjusting spring 13, is positioned on a purée outlet pipe 14, via which the purée passes into a tank schematically indicated by 15.

Figure 4:
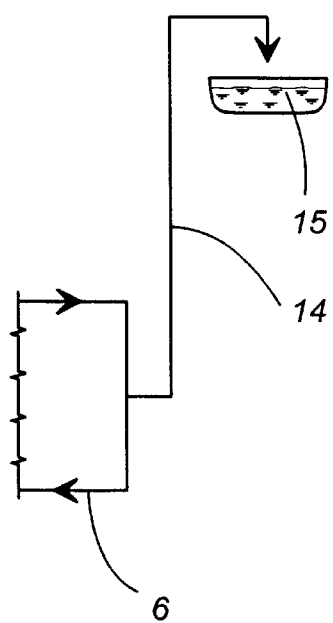
FIG. 4 illustrates a variation of embodiment of a detail of the plant according to FIG. 2.

According to a variation of embodiment illustrated in FIG. 4, the counter-pressure device is formed simply by raising the purée outlet pipe 14 in order to make use of the hydrostatic head of the purée. In this case the pipe 14 may be of the telescopic type in order to allow adjustment of the hydrostatic effect.

The duct, 10 and the recirculation circuit 6, in an original manner, are always completely filled with purée and there are no free-surface zones or tanks where the product is more easily subject to oxidation.

The introduction of purée at room temperature through the duct 10 causes the automatic outflow, from the plant, of an equal quantity of hot purée inactive from the point of view of enzymes.

The plant is very compact and has small dimensions since the softening/straining assembly 4 which performs extraction of the purée is located directly above the suction pipe of the lobe pump 7 which performs recirculation, so as to obtain rapid and almost immediate conversion from the whole product to the hot purée at the enzymatic inactivation temperature, which avoids possible deterioration of the product by the enzymes.

To ensure that all the purée emerging from the strainer reaches immediately a high temperature or in any case a temperature sufficient for enzymatic inactivation, without intermediate exposure periods, it is envisaged that supply of the whole product into the strainer is able to occur only if the corresponding quantity of purée is able to emerge from the plant, at the inactivation temperature.

In fact, between the stage of introduction of the whole product into the strainer and the stage involving outflow of the purée from the plant 1 there is no possibility of intermediate storage of the product, no tanks or other storage means being provided, precisely in order to ensure the optimum quality of the product and avoid degradation thereof.

Figure 5:
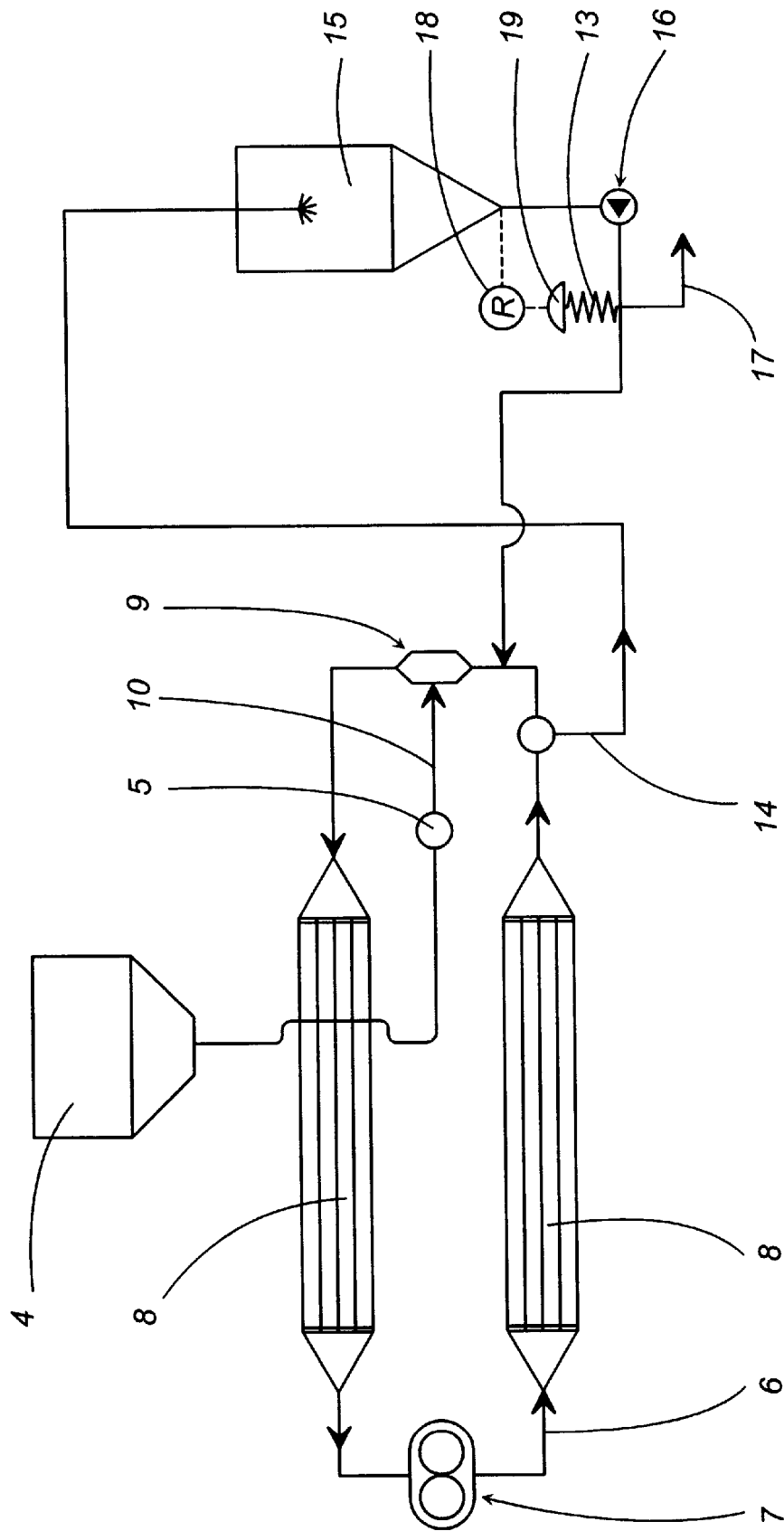
FIG. 5 illustrates a further variation of embodiment of the plant.

With particular reference to the variation of embodiment illustrated in FIG. 5, said embodiment has the purpose of reducing to a minimum the periods of heat exposure of the product by effecting a further reduction in the volume of the plant (a first reduction with respect to the prior art is that provided by the original plant of FIG. 2 where the rest tank envisaged in the solutions of the prior art has been eliminated) and in particular a reduction in the length of the pipes used.

This variation comprises two heat exchangers 8 (instead of only one as in the case of FIG. 2) in order to reduce the "inert" pipe section of the recirculation circuit 6, which has a maximum extension lengthwise of about 2–3 m.

The geometry of the plant and the arrangement of its components play a particularly role in reduction of the volumes and enhance the characteristics of the plant itself: doubling of the pipe bundle 8 ensures that the length of the connection pipes is reduced to two short tube portions, one of which contains the lobe pump, while the other one contains the mixer with the inlet and the recirculation outlet 14.

A further reduction in the pipes is not possible since it is necessary to set aside space for the insertion of the process monitoring instruments, such as for example the temperature probes, pressure sensors and safety valves.

In the plant according to FIG. 5 the "inert" sections, i.e. the piping sections which serve only for transfer of the purée, have therefore been eliminated. Via the outlet pipe 14 the product passes into a deaeration/evaporation tank 15 (which removes the air trapped in the product) and is then conveyed by a pump 16 again into the recirculation circuit 6.

The product with a sufficient concentration, greater than a predetermined limit value, emerges from the plant through an outlet 17.

A refractometer 18 measures the concentration in order to operate a pneumatic valve 19 regulated by a spring 13. In the recirculation circuit the lobe pump 7, located between the two pipe bundles of the exchangers 8, serves to provide a recovery in the pressure of the product, while the heat exchanger provides a temperature recovery. Normally, in fact, immediately upstream of the mixing device 9 the temperature is about 95° C., which drops to about 80° C. immediately downstream thereof owing to the introduction of fresh product supplied from the strainer 4.

The particular arrangement of the exchangers 8 and the lobe pump 7 improves the performance characteristics of the plant.

The present, plant is specific for the treatment of purée (the plant being after the strainer) and riot for chopped product or product into pieces. The elements of the plant (ducts of a small section, the device 9, and the valves) are not suitable for the treatment of chopped product or of product into pieces.

What is claimed:

1. A process for enzymatic inactivation of a food product comprising the steps of:

extracting purée from the food product at room temperature, heating the extracted purée in a recirculation circuit at a temperature such as to obtain enzymatic inactivation of the purée, and circulating the purée in the recirculating circuit kept full of the purée to prevent direct contact with environs containing air, steam or gas.

2. A process according to claim 1, further comprising:

permitting spontaneous automatic outflowing of a quantity of purée directly from the recirculation circuit at the enzymatic inactivation temperature in an amount equal to the quantity of purée entering at room temperature into the recirculation circuit.

3. A process according to claim 1, wherein the circulating step comprises mixing the purée entering the recirculation circuit at room temperature with heated purée in the circuit.

4. A process as in claim 1, wherein said circulating step includes heating the purée in a heat exchanger.

5. A process as in claim 2 wherein the circulating step comprises adding purée at room temperature to the heated purée in the recirculating circuit in an amount equal to the purée outflowing from the recirculating circuit.

6. A process as in claim 1 wherein said recirculating circuit comprises a pipe.

* * * * *